United States Patent
Mauger et al.

(10) Patent No.: US 6,466,578 B1
(45) Date of Patent: Oct. 15, 2002

(54) SCALEABLE DATA NETWORK ROUTER

(75) Inventors: Roy Harold Mauger, Radlett; Simon Daniel Brueckheimer, London; Brian Michael Unitt, Herts, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/319,137

(22) PCT Filed: Dec. 1, 1997

(86) PCT No.: PCT/GB97/03300
§ 371 (c)(1),
(2), (4) Date: Sep. 7, 1999

(87) PCT Pub. No.: WO98/24262
PCT Pub. Date: Jun. 4, 1998

(30) Foreign Application Priority Data

Nov. 29, 1996 (GB) ............................................. 9624916

(51) Int. Cl.$^7$ ............................................. H04L 12/28
(52) U.S. Cl. ..................................... 370/395.3; 370/401
(58) Field of Search .............................. 370/389, 395.1, 370/397, 399, 395.3, 395.31, 395.51, 395.53, 395.5, 395.6, 395.61, 395.63, 395.64, 395.65, 401, 402, 474

(56) References Cited

U.S. PATENT DOCUMENTS 5,684,800 A * 11/1997 Dobbins et al. ............ 370/401
5,752,003 A * 5/1998 Hart ............................ 395/500
5,825,772 A * 10/1998 Dobbins et al. ............ 370/396
6,229,787 B1 * 5/2001 Byrne ......................... 370/218

FOREIGN PATENT DOCUMENTS

WO      WO 95/17789         6/1995

OTHER PUBLICATIONS

Parulkar, "AITPM: A Strategy For Integrating IP With ATM", Computer Communications Review, vol. 25, No. 4, Oct. 1, 1995, pp. 49–58.
Box, "Architecture And Design Of Connectionless Data Service For A Public ATM Network", Networking: Foundation For The Future, Mar. 28–Apr. 1, 1993, vol. 2, pp. 722–731.

* cited by examiner

Primary Examiner—Wellington Chin
Assistant Examiner—Brenda Pham
(74) Attorney, Agent, or Firm—Lee, Mann, Smith, McWilliams, Sweeney & Ohlson

(57) ABSTRACT

In a broad band network comprising a plurality of edge switches interconnected by a plurality of tandem switches, IP packet data is routed by determining from each packet whether that packet forms part of a flow of packets. Where a packet is determined to be part of a flow, it is segmented into minicells for transmission over a permanent virtual channel established across the network for that flow. Where a packet is not determined to be part of a flow, a destination edge switch is identified for that packet which is then transported to that edge switch via a default permanent virtual channel. Permanent virtual channels for new flows are established at the network periphery by defining a succession of nodes and virtual channels (VCs) to be used to reach the destination of that flow.

9 Claims, 6 Drawing Sheets

Adaption Layer Switch Architecture

SCALEABLE DATA NETWORK ROUTER

This invention relates to communications networks and in particular to an arrangement and method for the routing of connectionless packet data in such networks.

BACKGROUND TO THE INVENTION

Data networks based on packet protocols, such as Internet Protocol (IP), use addressing information in the packet header to determine the destination of individual packets. Since each packet is treated independently of any other packet, the networks are connectionless. Packets pass individually through the network between router nodes which determine to which router the packet should be sent next. The processing power required to interpret packet header information and determine the route to the next network node limits the capacity of the router.

A discussion of techniques for enabling a combination of IP and ATM technologies is given by Parulkar et al. in Computer Communications Review, Vol.25, No.4, Oct. 1, 1995, pages 49 to 58. A description of a connectionless data service for an ATM network is given by Box et al. in Networking: Foundation for the Future, San Francisco, Mar. 28–Apr. 1, 1993, Vol. 2, Mar. 28, 1993, IEEE, pages 722 to 731.

In many instances, a communication between two terminal nodes in a communications network involves transmitting many IP packets in sequence. This is commonly referred to as a 'flow'. When a flow is identified by a router, a temporary link 'connection' can be set up through the network to carry this flow. All packets with the same header information can then pass over this connection, avoiding the need to process the headers on an individual basis. This technique is known as IP switching.

With the introduction of broad band asynchronous transfer mode (ATM) networks, there is now a need for the transport of connectionless packet traffic over such networks, particularly with the introduction of IP voice services to provide Internet based telephony. However, Internet traffic is not readily adapted to real time communication over a broad band network owing to its connectionless format, its multiple routing hops and its typical packet length which does not match the standard ATM cell.

SUMMARY OF THE INVENTION

An object of the invention is to minimise or to overcome this disadvantage.

A further object of the invention is to provide an improved method of carrying IP packet traffic over a broad band network.

The present invention relates to the use of IP switching techniques to implement a scaleable distributed router using ATM Adaptation Layer 2 (AAL2) as the bearer for IP packets identified as part of a flow.

According to a first aspect of the invention, there is provided a broad band network adapted to carry packet traffic and comprising a plurality of interconnected nodes, which nodes comprise tandem switches (12) and edge switches (13), said edge switches each incorporating an IP network interface or adapter (21) and being interconnected by permanent virtual channels via said tandem switches, wherein each said edge switch incorporates a cut-through routing function (52) having a memory (53) associated therewith for storing packet header information and having means for comparing header information from incoming packets with said stored information whereby to identify those packets forming a flow, means for segmenting each said packet determined to be part of a flow into minicells for transmission in sequence order over a said permanent virtual circuit established across the network for that flow, and default router means (55) for processing the packet headers of each of those packets not identified as part of a flow so as identify for that packet a destination edge switch for that packet and for segmenting that packet for transport over a default permanent virtual channel to said destination edge switch.

According to another aspect of the invention there is provided a method of transporting flow based and non-flow based packet traffic in a broad band network comprising a plurality of interconnected nodes, which nodes comprise tandem switches (12) and edge switches (13), said edge switches each incorporating an IP network interface or adapter (21) and being interconnected by permanent virtual channels via said tandem switches, the method including storing at each said edge switch packet header information, comparing header information from incoming packets with said stored information whereby to identify those packets forming a flow, segmenting each said packet determined to be part of a flow into minicells for transmission in sequence order over a said permanent virtual circuit established across the network for that flow, processing the packet headers of each of those packets not identified as part of a flow so as identify for that packet a destination edge switch for that packet, and segmenting that packet for transport over a default permanent virtual channel to said destination edge switch.

A flow is defined as an established sequence of IP packets from a source to a destination comprising e.g. a file transfer or an Internet voice call. In our arrangement, the ATM network functions as a distributed router whereby the IP packets are routed to the correct destination. Where a packet is identified as forming part of a flow, the destination will have already been established so that the packet payload can be carried in minicells over the permanent virtual channel that has been provisioned for that flow.

BRIEF DESCRIPTION OF THE DRAWINGS

An embodiment of the invention will now be described with respect to the following drawings in which.

DESCRIPTION OF PREFERRED EMBODIMENT

Figure 1:
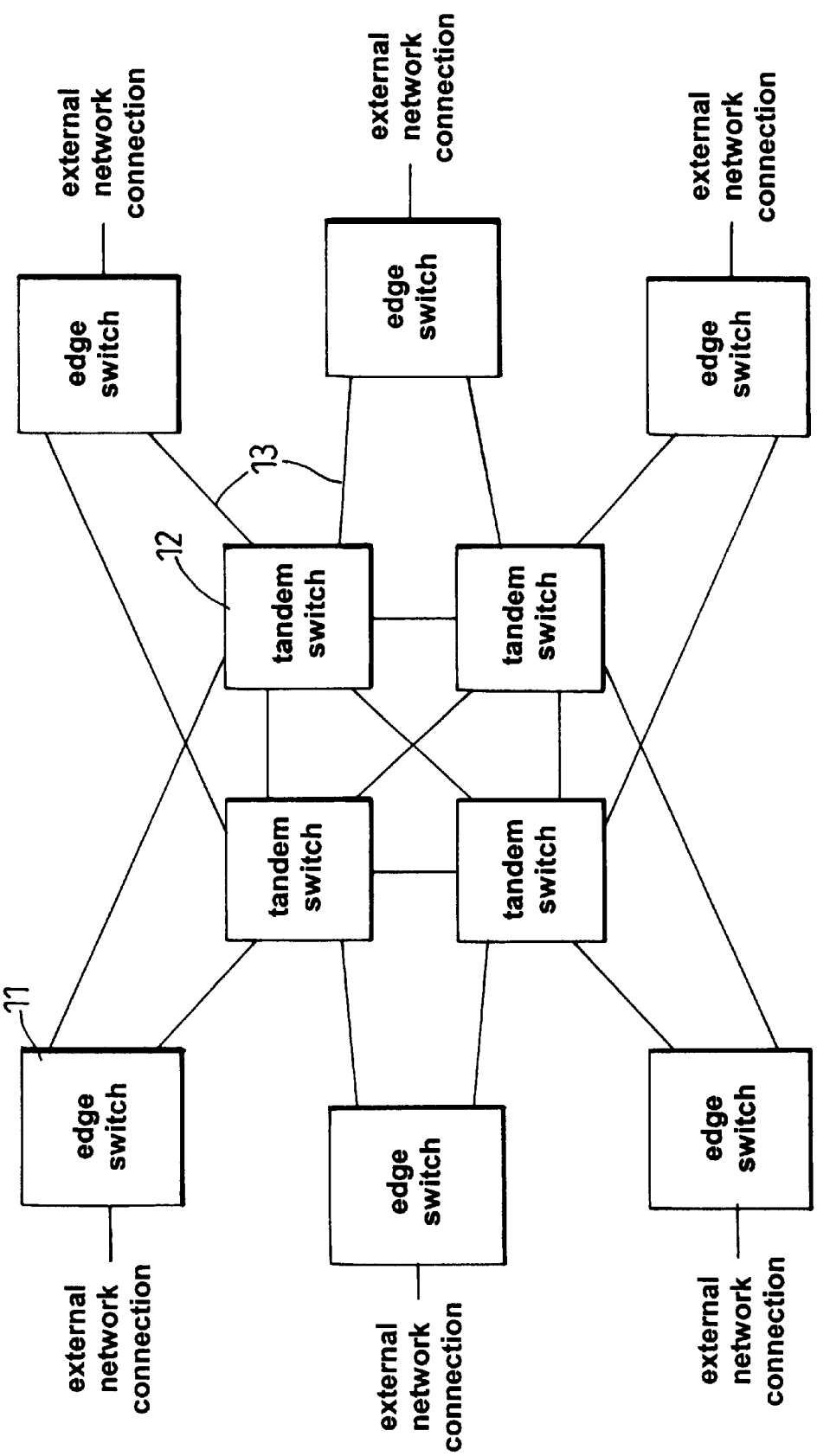
FIG. 1 is an overview of a data network arrangement according to an embodiment of the invention.

Referring to FIG. 1, the broad band network comprises a plurality of interconnected nodes which nodes are of two types, edge switches 11 and tandem switches 12Edge switches interconnect and interface with other elements of a data network and are themselves interconnected via tandem switches.

In the network of FIG. 1, nodes are interconnected by permanent virtual channels (PVCs) of a data network based on asynchronous transfer mode (ATM) technology. The ability of an ATM network to support PVCs between pairs of nodes on a network is well known. The PVCs are set up between each edge switch 11 and one or more tandem switches 12. Further PVCs are established between tandem switches 12 such that a highly or fully meshed core network is generated. Where each edge switch is connected to at least two tandem switches, then at least two possible routes will exist from any source edge switch to any other destination edge switch across the network.

In FIG. 1, for the purpose of illustration, traffic between any source edge switch passes to any destination edge switch through at most two tandem switches. It will be appreciated however that in a large practical network, traffic might pass through many tandem switches before reaching its destination edge switch.

Figure 2:
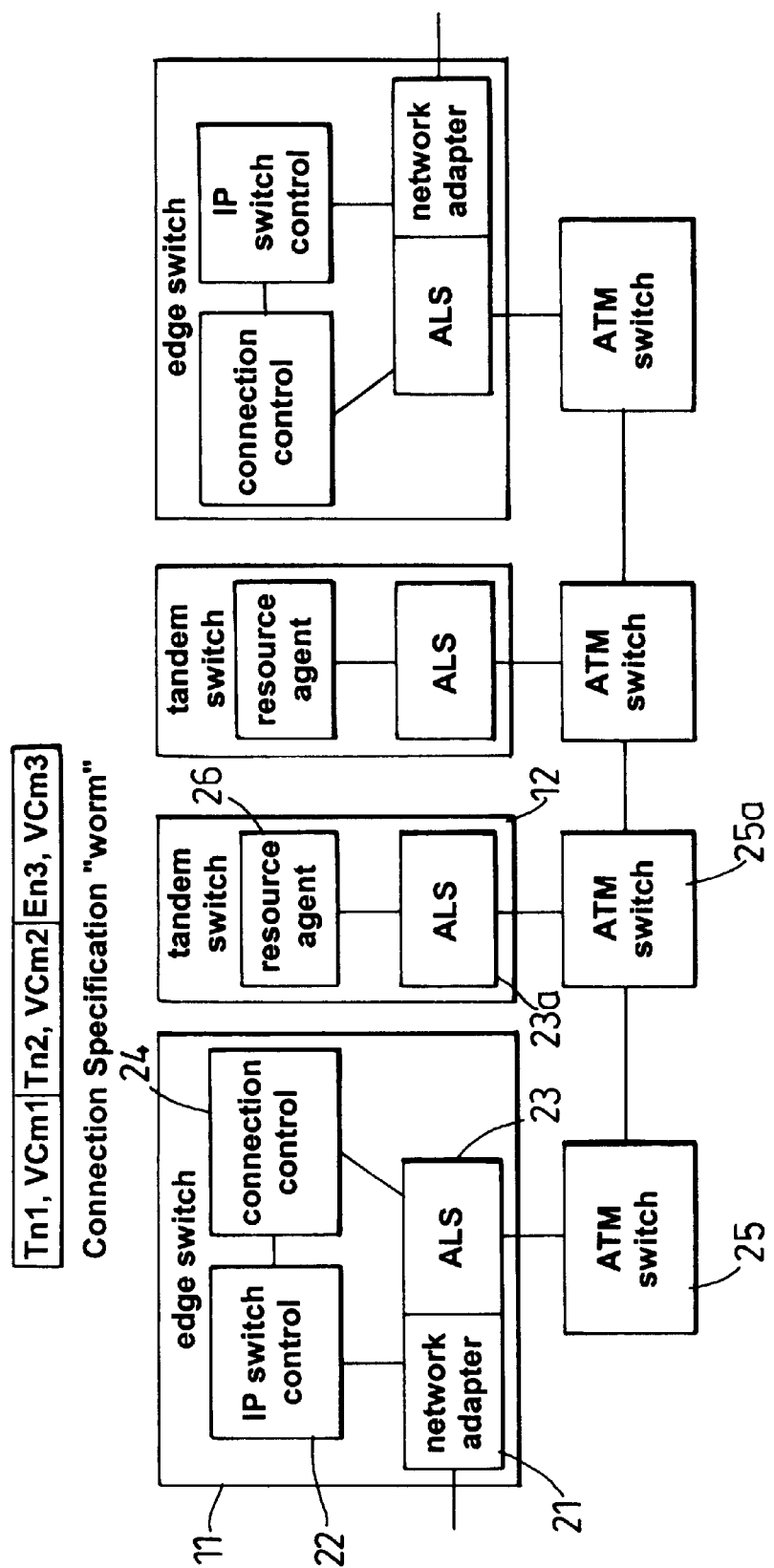
FIG. 2 is a block diagram of edge and tandem switches on an example route through the data network of FIG. 1.

FIG. 2 shows the general construction and interconnection of the edge switches and tandem switches. Each edge switch incorporates an IP network adaptor 21 providing an interface with an IP network employing e.g. an Ethernet protocol. The adaptor 21 is coupled to an IP switch control 22 and, via an adaptation layer switch (ALS) 23 to a connection control 24 and to an ATM switch 25. Each tandem switch comprises a resource agent 26 coupled via an adaptation layer switch 23a to an ATM switch 25a.

Figure 3:
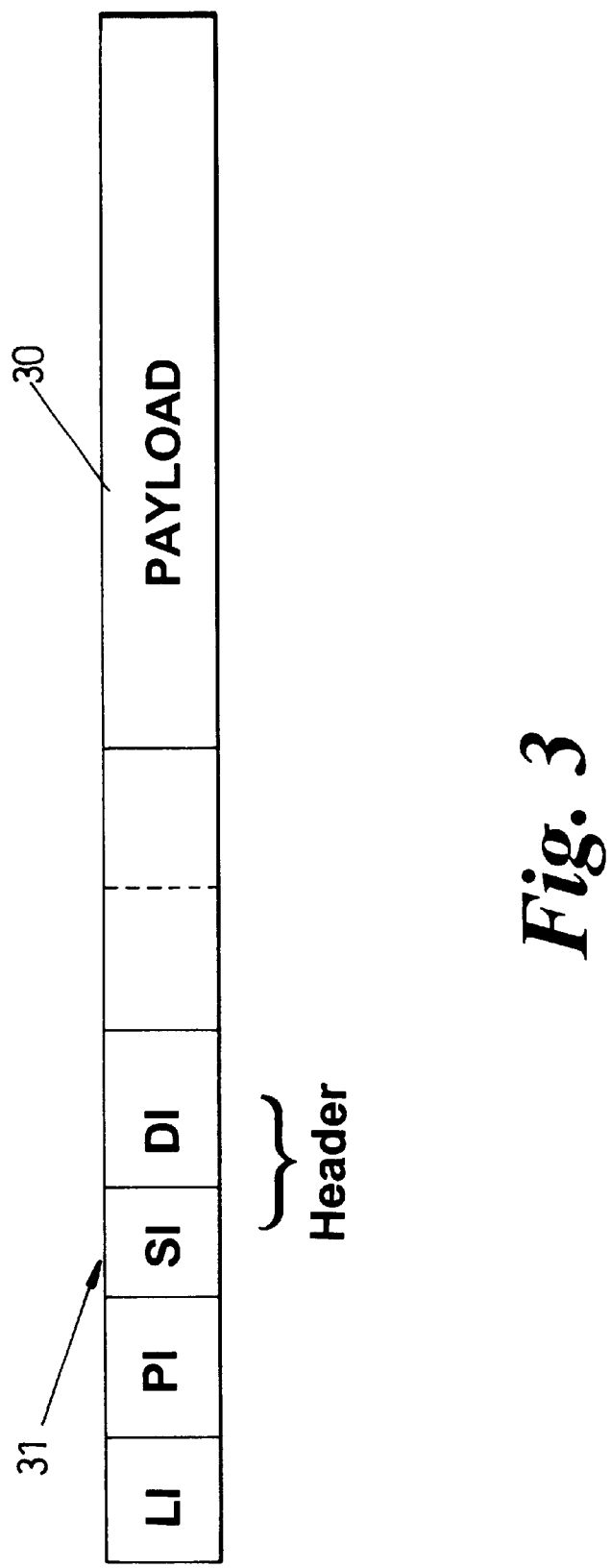
FIG. 3 illustrates the general construction of an IP packet.

FIG. 3 shows in schematic form the construction of a typical IP data packet comprising a payload 30 and a header 31 containing supervisory information. The header comprises a number of information fields including a packet length indicator (LI), a protocol indicator (PI), a source identity (SI) and a destination identity (DI). Other header fields (not shown) may be provided to indicate e.g. the nature of the payload content and a sequence number.

Figure 4:
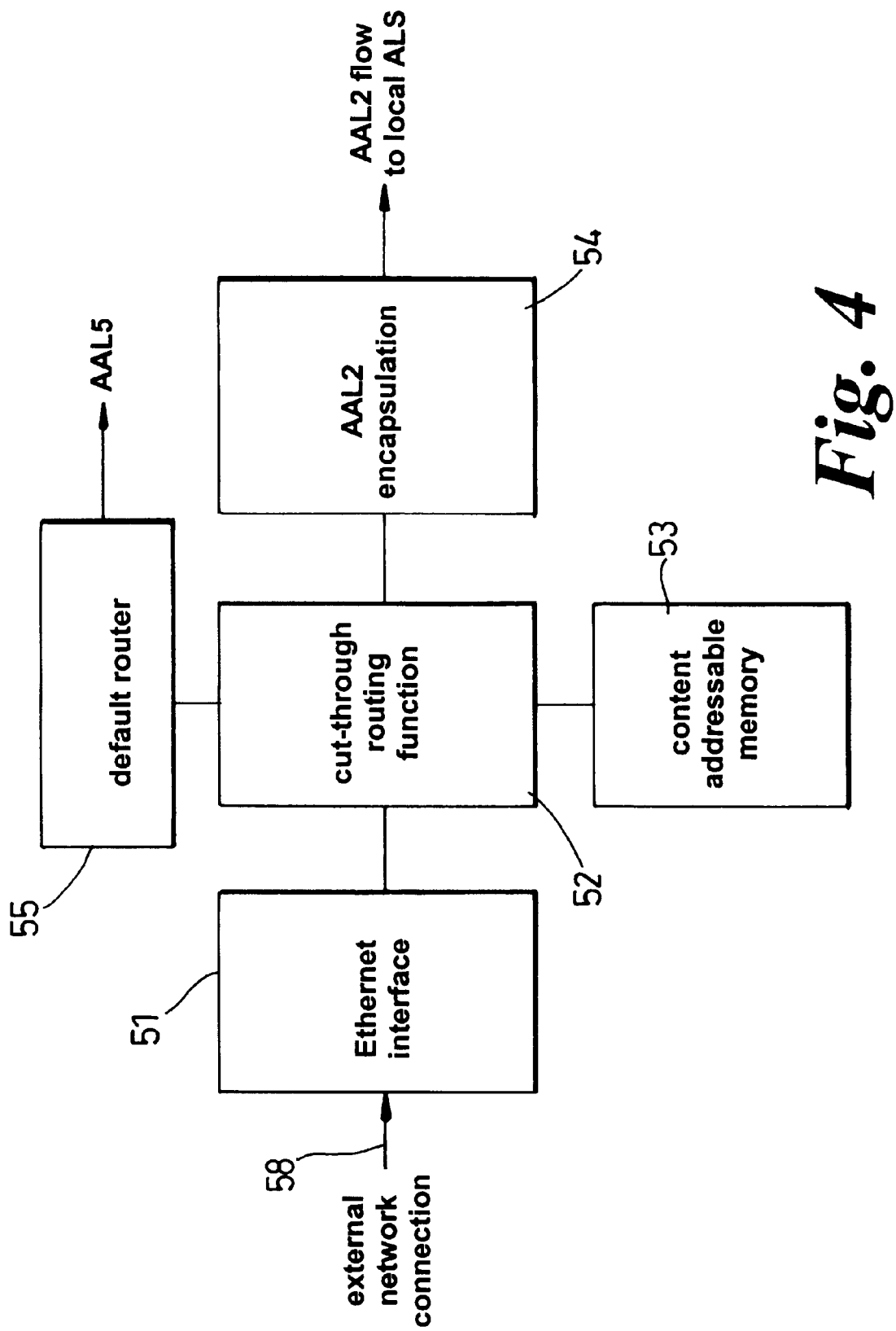
FIG. 4 is an example realisation of an adaptation layer switch in the network of FIG. 1.
Figure 5:
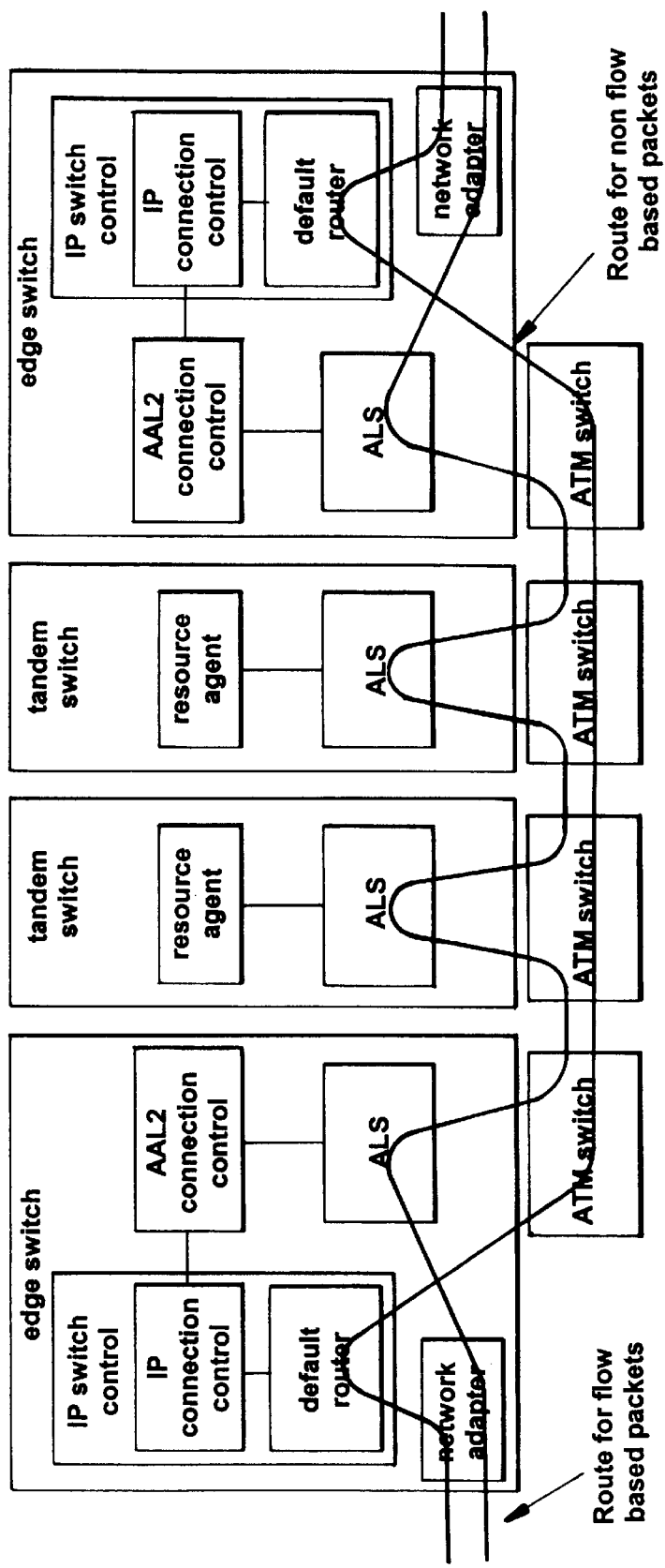
FIG. 5 is a block schematic diagram of the network adapter shown in FIG. 2.

FIG. 4 illustrates the network adapter function block of the edge switch of FIGS. 1 and 2. In this example, traffic in the form of data packets arrives at an Ethernet interface 51 from the externally connected data network on an Ethernet connection 58. After removal of the Ethernet link layer information, the data packet passes to the cut-through routing function 52. The routing function 52 compares the packet header information with the entries in a content addressable memory 53 to ascertain whether or not the incoming packet belongs to an already identified flow. If this is the case, the packet is segmented and encapsulated via an encapsulation function 53 in ATM adaptation layer 2 (AAL2) minicells for transmission over the connection which has been set up for that flow. The existence of a flow may be determined for example by the identification of a number of IP packets having the same source and destination identifiers. These identifiers from the first packet or packets of a suspected flow can be stored in the content addressable memory for comparison with corresponding information from subsequent packets.

Figure 6:
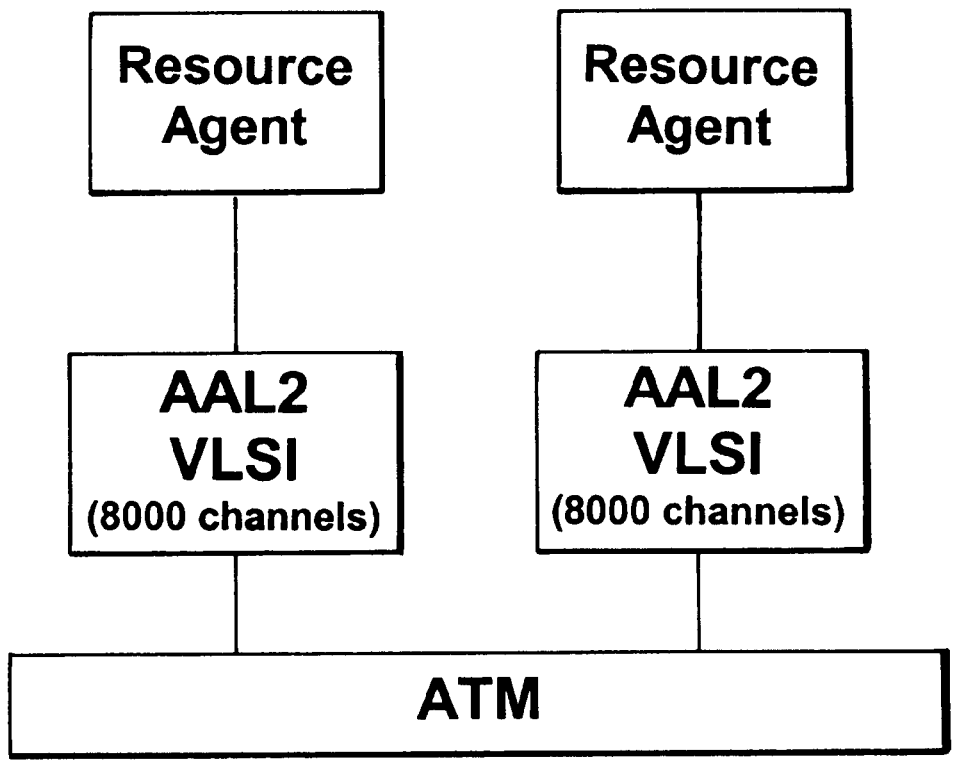
FIG. 6 shows example routes through the network of FIG. 1 for. flow based and non flow based packets.

If the packet is not recognised as belonging to a flow, the packet is passed to the default router 55 which processes the packet header to determine the distributed router output port (i.e. the edge switch) to which the packet should be sent. The packet is then segmented and sent over an ATM PVC to the destination port, using the underlying ATM network in the normal way as shown in FIG. 6. ATM adaptation layer 5 (AAL5) is to be preferred for this purpose. During processing of the packet header, the default router may determine that this packet is (or is likely to be) the first part of a flow. If so, packet addressing information is passed to the IP connection control 41 (FIG. 4) via the default router. The IP connection control then processes the packet addressing information to determine its destination and requests the AAL2 connection control to establish a route for the flow through the AAL2 adaptation layer switch (ALS) network. The function of the ALS is described in B-ISDN ATM Adaptation Layer Type 2 Specification 1363.2. The route may be established using a technique called 'Wormhole Routing'. A detailed description of this routing technique is given in our co-pending United Kingdom patent application No 9614138.7.

Although not shown in the drawings, it will be appreciated that sequence buffering may be provided at the network periphery to ensure the correct ordering of the first few packets of a flow. Once the flow is established, the use of the permanent virtual channel allocated to that flow ensures that subsequent packets are maintained in sequence over the ATM network between the transmitting and receiving edge switches.

Wormhole Routing is a technique whereby the connection admission control (CAC) function is performed on the periphery of the network leading to a connection specification or 'worm' (FIG. 2) which defines the succession of the nodes and the AAL2 VC's to be used to reach the endpoint. The CAC function is supported by resource agents built into the ALS components which monitor the usage of resources and report any impending exhaustion to the CAC functions at the periphery. This technique furnishes a guaranteed route through the ALS network, choosing between multiple path options to take account of congestion and path availability. Once this path is established, an entry is made in the content addressable memory 53 so that future packets belonging to the new flow will then be recognised and in consequence be correctly directed via the ALS network.

One possible implementation of an ALS node is illustrated in FIG. 3, the AAL2 function is implemented as a VLSI component serving typically 8000 channels. Multiple instances of this component are able to work over an ATM switch to achieve an ALS of n×8000 channels. In one particular embodiment 'n' can range from 1 to 60 so that an ALS node of about 500,000 channels is possible. The resource agent function is implemented in a processor associated with each VLSI component to implement the 'wormhole routing' within as well as between nodes.

At the far end of the link, flow based traffic is extracted from the AAL2 minicell stream and reassembled into IP packets in the terminating network adapter. The link layer information is added and the packet exits the distributed router via the terminating Ethernet interface.

In our arrangement and method, routing intelligence is distributed around the edge switches; intelligence is added as edge switches are added. The distributed router described therefore scales to very large sizes, and could be implemented to global dimensions. For example a network of 2000 edge switches and 200 tandem switches has the potential to provide 500 million customers with 0.1 Erlangs of communication sessions with up to 5 flows in each session.

The value of AAL2 in this context is that its minicell structure eliminates the cell assembly delay normally associated with ATM. This is a well known problem at lower bit rates where the time required to fill an ATM cell before it can be launched may be unacceptably long. As an example, consider an IP flow comprising a voice service using G729 coding then G729 is an 8 kb/s compression scheme which has a 10 byte frame and an encoding function which requires about 10 msec of processing. If this IP flow were to be packed into an AAL1 cell at four frames to a cell, then the cell assembly function would take 50 msec and a one cell receive buffer at the far end would add an additional 20 msec. This 70 msec delay inherent in the cell assembly process is a large part of the ITU objective of a maximum 150 msec delay for terrestrially routed voice calls. By contrast, the use of AAL2 in the arrangement and method described above allows for example a 10 byte voice frame to be launched at the end of compression processing, typically taking 20 msec, and the minicell itself can form the receive buffer delay of 5 msec. The delay of the ALS switches is fixed and substantially less than 1 msec, giving a total delay of about 25 msec rather than the 70 msec that was previously required. Thus, the use of AAL2 in our arrangement and method allows ATM to support compressed voice services with much lower latency and so allows IP voice services to achieve PSTN voice quality.

What is claimed is:

1. A broad band network adapted to carry packet traffic and comprising a plurality of interconnected nodes, which nodes comprise tandem switches (12) and edge switches (13), said edge switches each incorporating an IP network interface or adapter (21) and being interconnected by permanent virtual channels via said tandem switches, wherein each said edge switch incorporates a cut-through routing function (52) having a memory (53) associated therewith for storing packet header information and having means for comparing header information from incoming packets with said stored information whereby to identify those packets forming a flow, means for segmenting each said packet determined to be part of a flow into minicells for transmission in sequence order over a said permanent virtual circuit established across the network for that flow, and default router means (55) for processing the packet headers of each of those packets not identified as part of a flow so as identify for that packet a destination edge switch for that packet and for segmenting that packet for transport over a default permanent virtual channel to said destination edge switch.

2. A network as claimed in claim 1, and including means (53) for transporting the minicells containing said flow based traffic in ATM adaptation layer 2 (AAL2).

3. A network as claimed in claim 2, and including means for transporting said non-flow based traffic in ATM adaptation layer 5 (AAL5).

4. A network as claimed in claim 1, and including means for establishing a route for a new flow by defining on the periphery of the network a succession of nodes and virtual channels (VCs) to be used to reach the destination of that flow.

5. A network as claimed in claim 1, wherein said packets constituting a flow contain Internet voice traffic.

6. A method of transporting flow based and non-flow based packet traffic in a broad band network comprising a plurality of interconnected nodes, which nodes comprise tandem switches (12) and edge switches (13), said edge switches each incorporating an IP network interface or adapter (21) and being interconnected by permanent virtual channels via said tandem switches, the method including storing at each said edge switch packet header information, comparing header information from incoming packets with said stored information whereby to identify those packets forming a flow, segmenting each said packet determined to be part of a flow into minicells for transmission in sequence order over a said permanent virtual circuit established across the network for that flow, processing the packet headers of each of those packets not identified as part of a flow so as identify for that packet a destination edge switch for that packet, and segmenting that packet for transport over a default permanent virtual channel to said destination edge switch.

7. A method as claimed in claim 6, wherein a route for a new flow is established by defining on the periphery of the network a succession of nodes and virtual channels (VCs) to be used to reach the destination of that flow.

8. A method as claimed in claim 6, wherein the segmented packets constituting a flow are transported in ATM Adaptation Layer Two (AAL2) minicells.

9. A method as claimed in claim 6, wherein said packets contain Internet voice traffic.

* * * * *